Sept. 14, 1948.  E. MARTIN  2,449,240
CONVEYING MECHANISM
Filed July 19, 1946  4 Sheets-Sheet 1

INVENTOR.
Eugene Martin
BY Otto Moeller
ATTORNEY

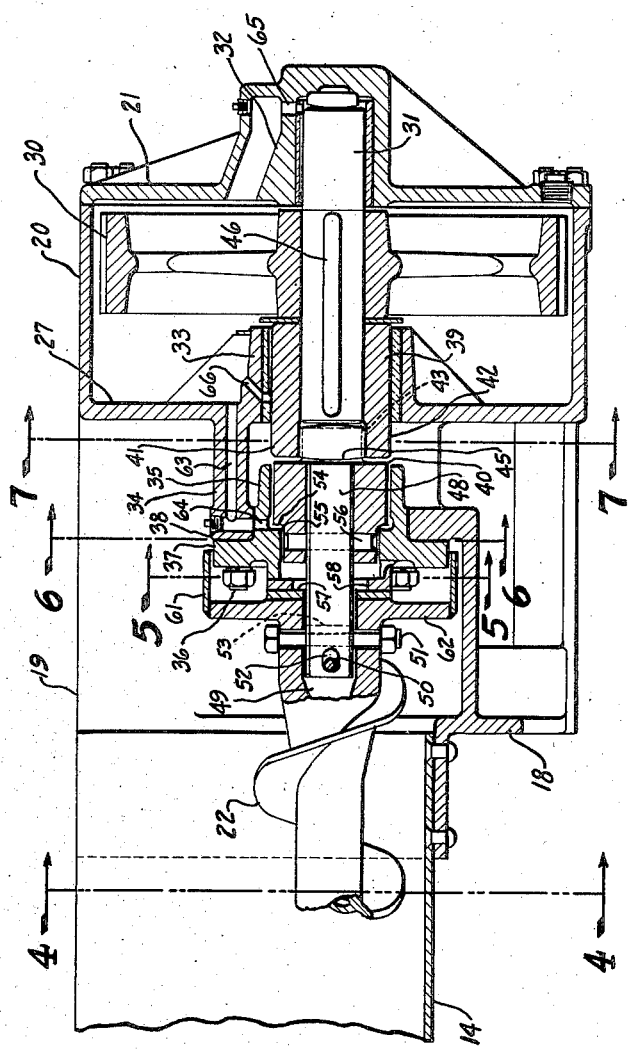

Sept. 14, 1948.　　　　　　　E. MARTIN　　　　　　　2,449,240
CONVEYING MECHANISM
Filed July 19, 1946　　　　　　　　　　　　　　　　4 Sheets-Sheet 3
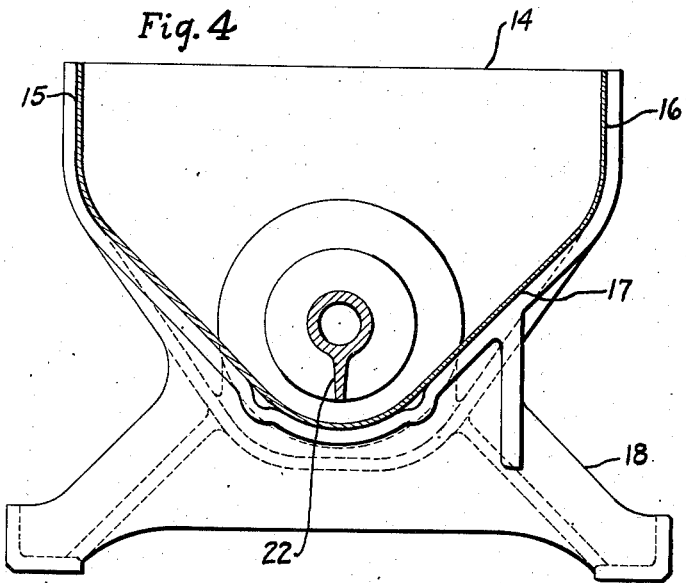
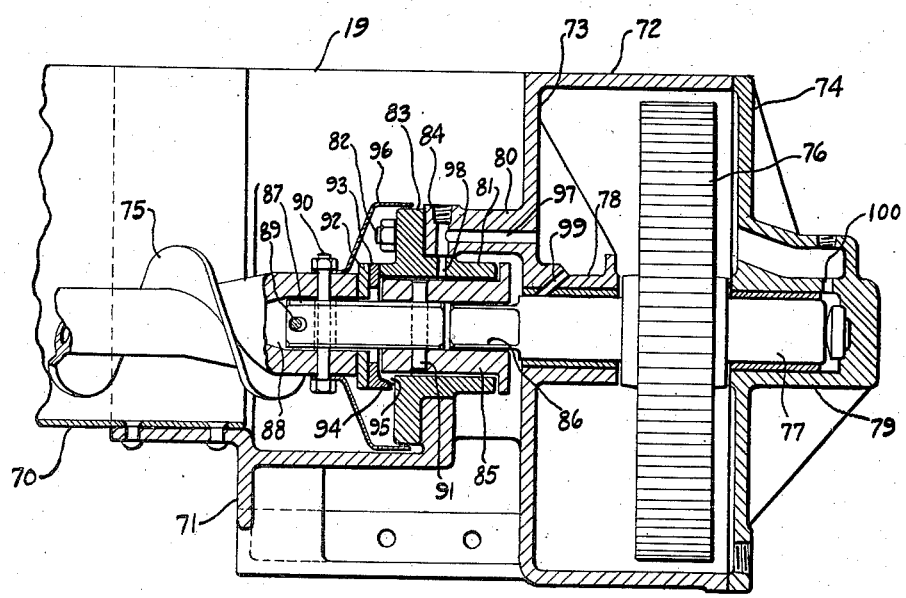
INVENTOR.
Eugene Martin
BY
Otto Moeller
ATTORNEY Sept. 14, 1948.  E. MARTIN  2,449,240
CONVEYING MECHANISM
Filed July 19, 1946  4 Sheets-Sheet 4
Fig. 5
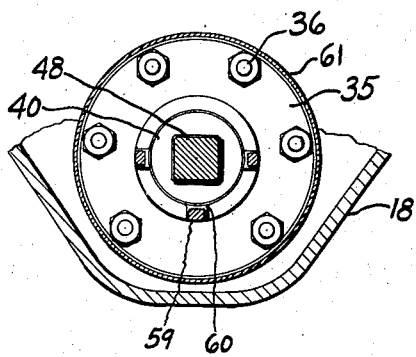
Fig. 6
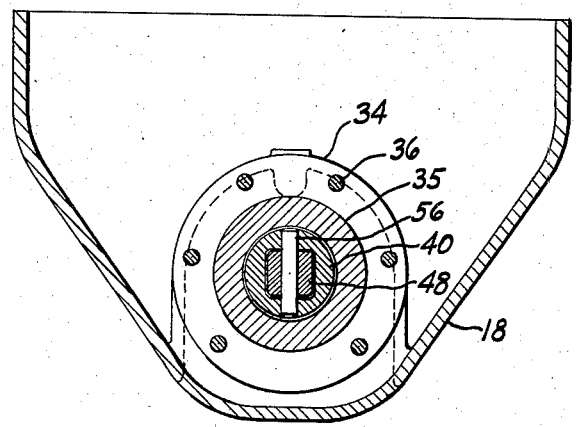
Fig. 7
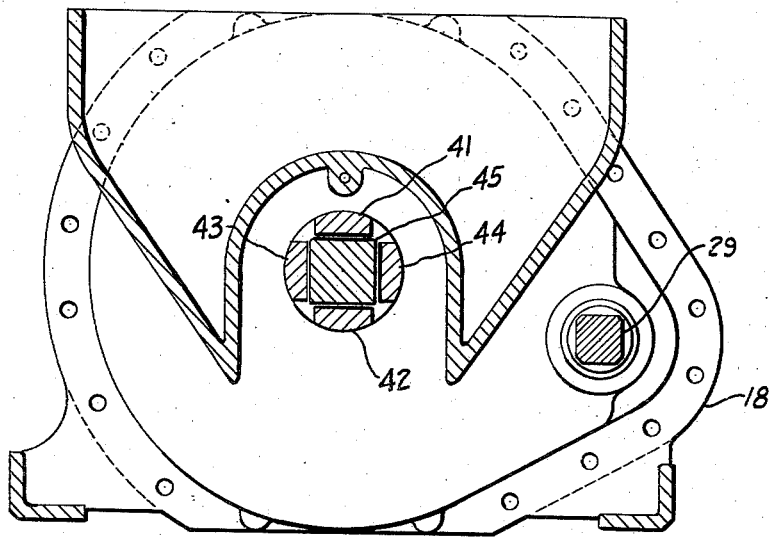
Fig. 7-A
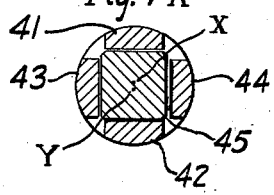
INVENTOR.
Eugene Martin
BY
Otto Moeller
ATTORNEY Patented Sept. 14, 1948

2,449,240

UNITED STATES PATENT OFFICE 2,449,240

CONVEYING MECHANISM

Eugene Martin, Wesleyville, Pa., assignor to The Standard Stoker Company, Incorporated, a corporation of Delaware Application July 19, 1946, Serial No. 684,862

12 Claims. (Cl. 198—213)

1

This invention relates to conveying mechanism including a conveyor screw mounted in a trough for the conveyance of material therethrough, a gear box at the rear of the trough housing suitable gearing and a drive shaft, and a drive connection between the drive shaft and screw conveyor.

In such conveying mechanism any force transmitted from the screw conveyor to the drive shaft giving rise to an axial angular strain on the latter will cause uneven and excessive wear on the bearings and the shaft and the resulting cocking of the shaft causes binding thereof and uneven and excessive wear on the gear teeth of the gearing with consequent failure of the drive mechanism. It is, therefore, an important object of my invention to provide a novel drive connection in conveying mechanism of the type described which will relieve the drive shaft of axial angular strains and minimize failure of the drive mechanism.

Another object of the invention is to provide, in a conveying system of the type described, an improved drive and bearing arrangement and construction eliminating transmission of stresses to the drive shaft incident to forward and rearward thrust of the conveyor screw resulting from its conveyance of material in a forward and reverse direction.

Still another object of the invention is to provide an improved drive connection in a conveying mechanism of the type described above, which will eliminate the transmission of stresses to the drive shaft incident to slight misalinement of the drive shaft and the conveyor screw or the bearings therefor.

It has been found desirable, in conveying mechanism of the type described, to eliminate bearings for the conveyor screw within the passageway for the material conveyed, and to provide a single bearing at the extreme rearward end of the conveyor screw. In such constructions it has been customary to provide for limited normal axial angular movement of the conveyor screw about its journaled end relative to the drive shaft. However, should an abnormal force be applied against the screw conveyor forward of its journaled end and in a direction transverse with respect to the axis thereof, as occurs at times when large lumps of material are conveyed or when relatively large pieces of foreign material are encountered, the limited axial angular movement of the conveyor screw is insufficient and an axial angular stress is exerted on the drive shaft. It is, therefore, another object of this invention,

2 to provide an improved drive connection in which such stresses on the drive shaft are relieved.

Still another object of the invention is to provide an improved conveyor trough and gear casing incorporating a novel mounting and bearing assembly for the adjacent ends of a conveyor screw shaft and the drive shaft for the conveyor screw.

With these and other objects in view, the invention consists of the features of construction, combination and arrangement of parts, hereinafter fully described and claimed, reference being had to the accompanying drawings, in which Figure 1 is a central longitudinal vertical section through a portion of a locomotive tender with the rearward portion of a stoker trough and its gear box applied thereto beneath the tender fuel bin and shown in elevation;

Figure 3 is a sectional view taken on the line 3—3 of Figure 2;

Figure 2:
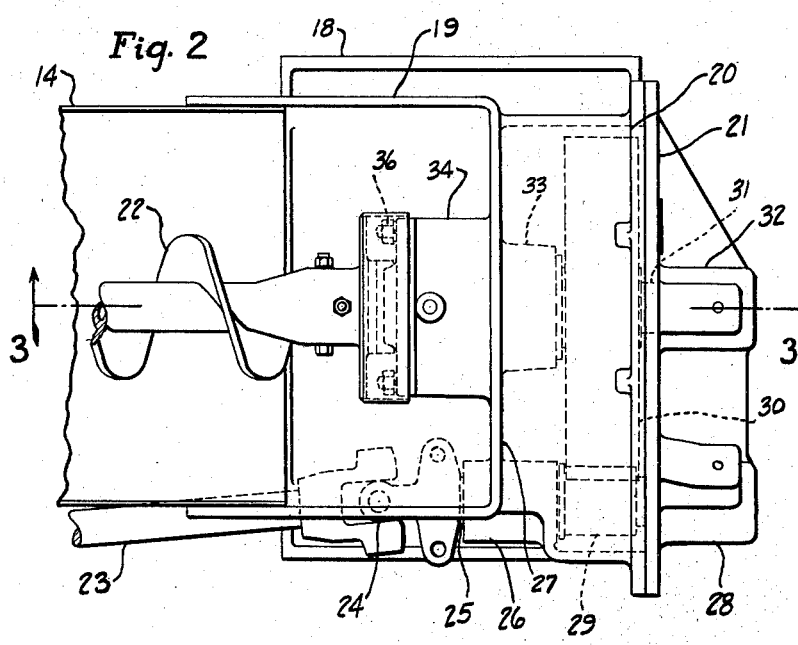
Figure 2 is a plan view of the portion of the stoker trough and gear box shown in Figure 1.

Figures 4, 5, 6 and 7 are sectional views taken on the lines 4—4, 5—5, 6—6 and 7—7, respectively, of Figure 3;

Figure 7A is a view of the driving connection shown in Figure 7 but with the axes of the shafts in misalinement; and Figure 8 is a central longitudinal vertical section through the rearward portion of a stoker trough and its gear box showing a modified form of the invention.

In the drawings, the invention is illustrated as applied to the tender unit of a locomotive stoker. Referring now to Figures 1 to 7, inclusive, showing a preferred embodiment of the invention, the tender, represented by the letter T in Figure 1, includes the base frame 10 upon which is supported a superstructure comprising the fuel compartment or bin 11 and the water compartment 12. A series of slidable plates 13 control the opening between the bin 11 and the stoker conveyor trough 14, through which opening coal passes from the bin to the trough.

The trough 14, as best shown in Figure 4, is formed with straight upper sides 15 and 16 and an approximately V-shaped lower portion 17. A casting 18, including a trough shaped portion 19 and a gear box 20, forms the rearward end of the trough 14. The rearward end of the gear box 20 is provided with a detachable cover 21, which when removed, allows access to the interior of the gear box.

Figure 1:
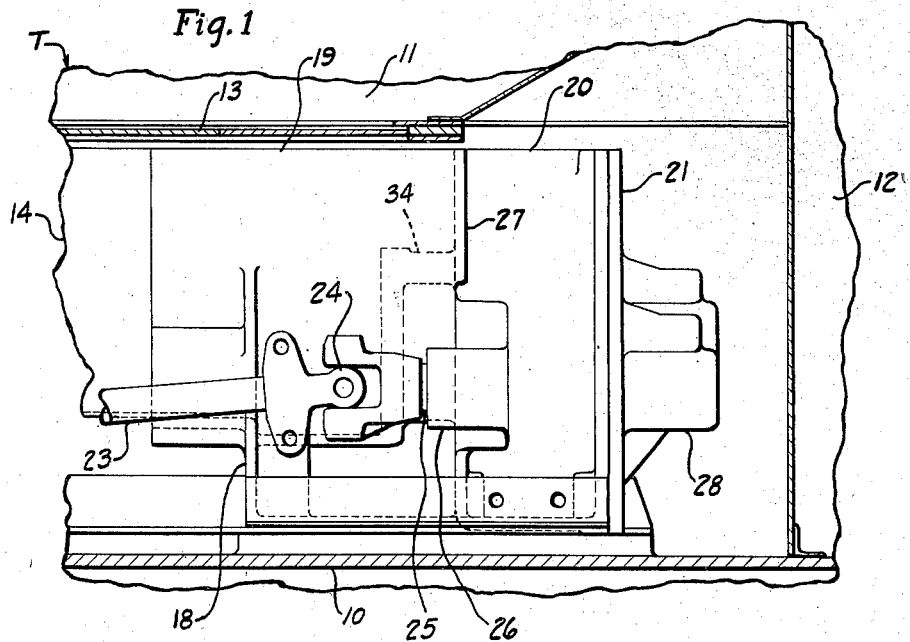

Coal is advanced through the trough 14 by a screw conveyor 22 which is operated by a suitable prime mover (not shown) through gearing in the gear box 20, power from the prime mover being transmitted to the gearing through the power shaft 23 which extends along one side of the trough 14, as shown in Figures 1 and 2. A flexible coupling 24 operatively connects the power shaft 23 with the pinion shaft 25 which is mounted at its forward end in a bearing 26 formed with the front wall 27 of the gear box 20 and at its rearward end in a bearing 28 formed with the gear box cover 21. The shaft 25 is provided with a pinion 29 which meshes with and operates the gear 30.

The gear 30 is mounted on a shaft 31 arranged to be normally in axial alinement with the conveyor screw 22. At its rearward end, the shaft 31 is mounted in a bearing 32 formed with the gear box cover 21, and at its forward end it is mounted, in a manner to be described, in a bearing 33 formed with the front wall 27 of the gear box 20.

In conveying material, it is desirable that the passageway for the material be free from bearings as it has been found that bearings for the conveyor screw, when placed within the passageway for material, obstruct the free conveyance thereof. When friable material is conveyed, the bearings also cause excessive breakdown in the size of the material conveyed, which in many instances is undesirable, as in the conveyance of coal in a locomotive stoker. It has been usual, therefore, to provide but one bearing for the conveyor screw, at one extreme end thereof, and of course, in such an arrangement the screw conveyor will have a certain amount of pivotal or angular movement about its journaled end. It is, furthermore, desirable to have some flexibility of movement in the conveyor screw to facilitate the passage through the trough of foreign materials, such as railroad spikes, tramp iron, etc., which frequently find their way into the coal bin of a locomotive tender.

Because of the axial angular movement of the conveyor screw about its journaled end, it is necessary that a certain amount of flexibility be provided between the driven end portion of the conveyor screw and the bearing therefor and the drive mechanism. Since, in the construction shown in the drawings, the trough 14 is rigidly mounted on the tender frame 10, it is evident that in the absence of such a flexible connection, excessive wear on the bearings will occur; and with such wear the misalinement of the drive shaft will cause excessive wear on the teeth of the gear 30 and pinion 29. I have devised a novel, compact and efficient construction which provides for this flexibility, it also relieves the drive shaft 31 and its gear 30 from the rearward thrust exerted against the screw conveyor 22 in its conveyance of coal and from the forward thrust of the screw conveyor when the latter is reversed; it provides ample bearing surface, and efficient means for lubrication of the bearings.

A housing 34, formed with the front wall 27 of the gear box projects inwardly of the trough 14 and is arranged to receive a bearing 35, the bore of which is normally concentric with the axis of the shaft 31. A plurality of bolts 36 extending through the circumferential flange 37 of bearing 35 and threaded into the enlarged free end 38 of the housing 34, rigidly secure the bearing 35 to the housing 34.

Rotatably mounted in the bearings 33 and 35, respectively, are co-axially arranged sleeves 39 and 40, the adjacent ends of which are provided with loosely interfitted tongues, as best shown in Figure 7, the sleeve 39 having diametrically opposite tongues 41 and 42 and the sleeve 40 having diametrically opposite tongues 43 and 44. The outside surface of each tongue is formed on a radius, preferably the same radius as the periphery of the sleeve with which it is formed. The inside surface of each tongue is flat, as shown in Figure 7, the inside surfaces of each pair of diametrically opposite tongues being parallel. The flat inside surfaces of the interfitted tongues define a space in which is received the block 45, forming a drive connection between the sleeves 39 and 40. As shown in Figure 7, the sides of the block 45 fit closely against the inside surfaces of the tongues 41, 42, 43 and 44, thereby preventing relative rotational movement between the sleeves 39 and 40.

Rotation is imparted to the sleeve 39 through engagement of the key 46, formed with the driving shaft 31, in a keyway (not shown) formed in the sleeve 39, and as described above, rotation of the sleeve 39 is transmitted to sleeve 40 through engagement of the block 45 with the tongues 41, 42, 43 and 44.

An intermediate shaft 48, polygonal in transverse cross section, is disposed between and normally in axial alinement with the driving shaft 31 and the conveyor screw 22, and is arranged with its forward end extending into the polygonal socket 49 formed in the rearward end of the conveyor screw 22 and its rearward end extending into the polygonal bore of the sleeve 40. Engagement of the polygonal shaft 48 in the polygonal socket 49 and polygonal bore of the sleeve 40 forms a drive connection between the sleeve 40 and conveyor screw 22. As shown in Figure 3, the forward end of intermediate shaft 48 fits loosely in the socketed end of conveyor screw 22, providing for limited angular axial movement of the conveyor screw 22 about its rearward end.

Referring to Figures 3, 7 and 7A, it will be seen that driving relation between the intermediate shaft 48 and driving shaft 31 is maintained even when these shafts are not in alinement, and without stresses being set up in either shaft because of such misalinement. For example, if the letter $x$ in Figure 7A represents the axis of the shaft 31 and $y$ represents the axis of the shaft 48, driving relation therebetween is maintained since the block 45 is freely slidable along the opposing inside surfaces of the tongues 41, 42 and 43, 44 of the sleeves 39 and 40 respectively. Since the construction described permits free driving relation between shafts 31 and 48 when the latter are in misalinement, it will be seen that it compensates for misalinement of the bearings 33 and 35 or sleeves 39 and 40, either as originally assembled or resulting from uneven wear. Furthermore, the separate intermediate shaft and the flexible drive connection between the sleeves 39 and 40, as described above, inhibits the transfer of stresses to the driving shaft 31 incident to axial angular force on the screw conveyor 22 in excess of that which the loose fit between the intermediate shaft 48 and the screw conveyor 22 will compensate for.

Bolts 50 and 51 extend through longitudinally spaced, perpendicularly related openings in the rearward end of the conveyor screw shaft and the forward end of the shaft 48 to prevent disengagement of the conveyor screw 22 from its operative relation with the shaft 48. The openings in shaft 48 are of a diameter to provide a loose fit for the bolts 50 and 51 and are also longitudinally elongated, as shown at 52 and 53, for a purpose hereinafter described. The loose fit of the bolts 50 and 51 in the intermediate shaft 48, together with the loose fit of the intermediate shaft 48 in the socketed portion of the conveyor screw 22 described above, is sufficient to allow normal axial angular movement of the conveyor screw 22 to take place without binding action between the parts.

A shoulder 54 of the sleeve 40 abuts a shoulder 55 of the bearing 35 preventing forward movement of the sleeve 40 and the pin 56 carried by the sleeve 40 and extending through the intermediate shaft 48 together with the bolts 50, 51 extending through the conveyor screw shaft and intermediate shaft 48, prevents forward movement or disengagement of conveyor screw 22. This construction together with the fact that intermediate shaft 48 is separate from driving shaft 31, it is evident, relieves the shaft 31 of any strain incident to forward thrust of the conveyor screw 22, occurring when the conveyor screw is reversed.

Rearward thrust of the conveyor screw 22 incident to its conveyance of coal is transmitted through the bearing 35 to the casting 18 by a thrust washer 57 mounted on intermediate shaft 48 adjacent the rearward end of the conveyor screw 22 and arranged to rotate with the shaft 48, and a thrust washer 58 mounted on the shaft 48 between the thrust washer 57 and the outer end of the bearing 35. The thrust washer 58 is provided with a plurality of lugs 59 arranged to be received in slots 60 formed in the bearing 35, as best shown in Figure 5. As wear between the washers 57 and 58 occurs and the conveyor screw moves correspondingly rearward, the slots 52, 53 previously described, permit deeper penetration of the forward end of shaft 48 into the socket 49 of conveyor screw 22. It is apparent, therefore, that no thrust is transmitted through the shaft 48 to the sleeve 40 nor to the block 45 and driving shaft 31.

A protecting cover 61 is securely attached, as by welding, to the periphery of a flange 62, formed with the rearward end of the shaft of conveyor screw 22, and projects rearwardly to embrace the forward end of the bearing 35. The passages 63 and 64 in the housing 34 and bearing 35, respectively, provide for the flow of lubricant from the gear casing 20, which forms a lubricant reservoir, to the adjacent surfaces of the bearing 35 and sleeve 40. Passages 65 and 66 in the bearings 32 and 33, respectively, provide for flow of lubricant from the gear casing 20 to the rearward end of shaft 31 and the sleeve 39, respectively.

From the foregoing it is evident that the driving shaft 31 is relieved of all stresses under any operating conditions except for the torsional stress resulting from driving the conveyor screw 22.

In Figure 8 there is shown a modified form of the drive connection between the drive shaft and the conveyor screw. The trough 70, end casting 71, gear box 72 including its front wall 73 and cover 74, and screw conveyor 75 are the same or substantially similar to the corresponding elements of the preferred form of the invention.

The gear 76 is mounted on the drive shaft 77 which is journaled in the bearings 78 and 79 formed with the gear box front wall 73 and cover 74, respectively. A housing 80 formed with the front wall 73 of the gear box 72 projects inwardly of the trough 70 and is arranged to receive a bearing 81, the bore of which is normally concentric with the axis of the shaft 77. A plurality of bolts 82 extending through the circumferential flange 83 of bearing 81 and threaded into the enlarged free end 84 of the housing 80, rigidly secure the bearing 81 to the housing 80. Mounted in the bearing 81 is a sleeve 85.

A polygonal extension 86 of the shaft 77 enters a corresponding bore in the sleeve 85, forming a drive connection between the shaft 77 and sleeve 85. An intermediate shaft 87, polygonal in transverse cross section, is arranged with its rearward end extending into the sleeve 85 and its forward end entering the polygonal socket 88 in the conveyor screw 75, providing a drive connection between the sleeve 85 and the conveyor screw 75. The rearward end of intermediate shaft 87 fits closely in the sleeve 85, while the forward end of intermediate shaft 87 fits loosely in the socketed end of conveyor screw 75, providing for limited angular axial movement of the conveyor screw 75 about its rearward end. Furthermore, the separate intermediate shaft 87 between the drive shaft 77 and the screw conveyor 75 eliminates the transfer of transverse strains to the drive shaft 77 incident to axial angular force on the conveyor screw 75 in excess of that which the loose fit between the intermediate shaft 87 and the conveyor screw 75 will compensate for. A loose fit is provided between the shaft extension 86 and the sleeve 85 to compensate for slight misalinement of the bearings 78, 79 and 81, either as originally assembled or when caused by uneven wear in service, thereby eliminating transverse strains on the shaft 77.

Bolts 89 and 90, carried by the conveyor screw 75 pass loosely through the intermediate shaft 87 to prevent disengagement of the conveyor screw 75 from its operative relation with the shaft 87. The loose fit between the bolts 89 and 90 and intermediate shaft 87, together with the loose fit between the shaft 87 and the socketed portion of the conveyor screw 75 described above, is sufficient to allow normal axial angular movement of the screw conveyor 75 to take place without binding action between the parts. A pin 91 carried by the sleeve 85 and extending through the intermediate shaft 87, together with the bolts 89, 90 carried by the conveyor screw 75 and extending through the intermediate shaft 87, prevent displacement of the conveyor screw 75 in a forward direction, and since the drive shaft 77 is separate from intermediate shaft 87 and its extension 86 is loosely mounted in the sleeve 85, it is relieved of any strain incident to forward thrust of the conveyor screw 75.

Rearward thrust of the conveyor screw 75, incident to its conveyance of coal is transmitted through the bearing 81 to the casting 71 by a thrust washer 92 mounted on intermediate shaft 87 adjacent the rearward end of the conveyor screw and arranged to rotate with the shaft 87, and a thrust washer 93 mounted on the shaft 87 between the thrust washer 92 and the outer end of the bearing 81. The thrust washer 93 is provided with a plurality of lugs 94 arranged to be received in slots 95 formed in the bearing 81 in the same manner as in the preferred form of the invention. It is evident then, that the shaft 77 is relieved of any strain incident to rearward thrust of the conveyor screw 75.

A protecting cover 96 is securely attached to the rearward end of the conveyor screw 75 by means of the bolt 90, the cover flaring rearwardly and embracing the forward end of the bearing 81. The passages 97 and 98 in the housing 80 and bearing 81, respectively, provide for the flow of lubricant from the gear casing 72, which forms a lubricant reservoir, to the adjacent surfaces of the bearing 81 and sleeve 85. Passages 99 and 100, respectively, provide for flow of lubricant from the gear casing 72 to the portions of the shaft 77 mounted in the bearings 78 and 79, respectively.

I claim:

1. In a conveying system, a conveyor screw, a driving shaft and an intermediate shaft between and normally in axial alinement with said conveyor screw and driving shaft, a loose driving connection between the adjacent ends of said conveyor screw and intermediate shaft providing for limited axial misalinement therebetween and limited angular movement of said conveyor screw about its driven end, a bearing, a sleeve rotatably mounted in said bearing, said sleeve receiving the other end of said intermediate shaft, said sleeve and intermediate shaft being arranged for rotation one with the other, and a drive connection between said sleeve and said driving shaft providing for limited axial misalinement between said intermediate and driving shafts.

2. In a conveying system, a conveyor screw, a driving shaft and an intermediate shaft between and normally in axial alinement with said conveyor screw and driving shaft, a loose driving connection between the adjacent ends of said conveyor screw and intermediate shaft providing for limited axial misalinement therebetween and limited angular movement of said conveyor screw about its driven end, a bearing, a sleeve rotatably mounted in said bearing, said sleeve receiving the other end of said intermediate shaft, said sleeve and intermediate shaft being arranged for rotation one with the other, and a drive connection between said sleeve and said driving shaft providing for limited axial misalinement between said intermediate and driving shafts and means for transmitting the rearward thrust of said conveyor screw to said bearing.

3. In a conveying system, a conduit, a conveyor screw in said conduit, a gear casing forming the rear of said conduit, a driving shaft mounted in said casing, an intermediate shaft between said conveyor screw and said driving shaft, a housing formed with said gear casing and extending into said conduit, a bearing secured to said housing, said bearing having a cylindrical bore, a cylindrical sleeve rotatably mounted in said bearing, said sleeve receiving the rearward end of said intermediate shaft, a drive connection between said sleeve and said intermediate shaft, a drive connection between said sleeve and said driving shaft and means providing a drive connection between the adjacent ends of said intermediate shaft and said conveyor screw.

4. In a conveying system, a conduit, a conveyor screw in said conduit, a gear casing forming the rear of said conduit, a driving shaft in said casing, an intermediate shaft between said conveyor screw and said driving shaft, a housing formed with said gear casing and extending into said conduit, a bearing secured to said housing without said gear casing, and a bearing formed within said gear casing, a sleeve rotatably mounted in each of said bearings, the adjacent ends of said intermediate shaft and said driving shaft being received in said sleeves, respectively, and connected for rotation therewith, means providing a drive connection between said sleeves, and means providing a drive connection between said intermediate shaft and said screw conveyor.

5. In a conveying system, a conduit, a conveyor screw in said conduit, a gear casing forming the rear of said conduit, a driving shaft in said casing, an intermediate shaft between said conveyor screw and said driving shaft, a housing formed with said gear casing and extending into said conduit, a bearing secured to said housing without said gear casing and a bearing formed within said gear casing, a sleeve rotatably mounted in each of said bearings, the adjacent ends of said intermediate shaft and said driving shaft being received in said sleeves, respectively, and connected for rotation therewith, means providing a drive connection between said sleeves, means providing a drive connection between said intermediate shaft and said screw conveyor, said housing and first named bearing and said second named bearing being each provided with a passage opening at one end into said gear casing and at the other end into the bore of a respective bearing for passage of lubricant from said gear casing to a respective sleeve.

6. A drive connection between a driving shaft and a conveyor screw, including an intermediate shaft between and normally in axial alinement with said driving shaft and conveyor screw, a bearing for each of the adjacent ends of said intermediate and driving shafts, a sleeve rotatably mounted in each of said bearings, the respective adjacent ends of said intermediate and driving shafts being each received in a respective sleeve and arranged for rotation therewith, said sleeves each having a pair of diametrically opposite tongues at their adjacent ends loosely interfitted at approximately right angles to each other, a coupling block within and engaging said interfitted tongues to form a drive connection therebetween, said coupling block being slidable with respect to each pair of opposed tongues in a direction at right angles with respect to the axes of said sleeves to maintain said drive connection upon limited misalinement of said shafts, and means providing a loose fitting drive connection between the adjacent ends of said intermediate shaft and said conveyor screw.

7. A drive connection between a driving shaft and a conveyor screw, including an intermediate shaft between and normally in axial alinement with said driving shaft and conveyor screw, a bearing for each of the adjacent ends of said intermediate and driving shafts, a cylindrical sleeve rotatably mounted in each of said bearings, the respective adjacent ends of said intermediate and driving shafts being each received in a respective sleeve and arranged for rotation therewith, said sleeves each having a pair of diametrically opposite tongues at their adjacent ends loosely interfitted at approximately right angles to each other, a coupling block within and engaging said interfitted tongues to form a drive connection therebetween, said coupling block being slidable with respect to each pair of opposed tongues in a direction at right angles with respect to the axes of said sleeves to maintain said drive connection upon limited misalinement of said shafts, means providing a loose fitting drive connection between the adjacent ends of said intermediate shaft and said conveyor screw, and means for transmitting the thrust of said conveyor screw to the bearing for said intermediate shaft.

8. A drive connection between a driving shaft and a driven shaft including a sleeve on each of the adjacent ends of said shafts, each shaft and its respective sleeve being arranged for rotation one with the other, said sleeves each having a pair of diametrically opposite tongues at their respective adjacent ends loosely interfitted at approximately right angles to each other, a coupling block within and engaging said interfitted tongues to form a drive connection therebetween, said coupling block being slidable with respect to each pair of opposed tongues in a direction at right angles with respect to the axes of said sleeves to maintain said drive connection upon limited axial misalinement of said shafts.

9. In a conveying system, a conduit, a conveyor screw in said conduit, a gear casing forming the rear of said conduit, a driving shaft mounted in said casing and extending forwardly therethrough, an intermediate shaft between said conveyor screw and said driving shaft, a housing formed with said gear casing and extending into said conduit, a bearing secured to said housing, said bearing having a cylindrical bore, a cylindrical sleeve rotatably mounted in said bearing, said sleeve receiving the adjacent ends of said intermediate shaft and driving shaft extension and forming a drive connection therebetween, and means providing a drive connection between the adjacent ends of said intermediate shaft and said conveyor screw.

10. In a conveying system, a conduit, a conveyor screw in said conduit, a gear casing forming the rear of said conduit, a driving shaft mounted in said casing and extending forwardly therethrough, an intermediate shaft between said conveyor screw and said driving shaft, a housing formed with said gear casing and extending into said conduit, a bearing secured to said housing, said bearing having a cylindrical bore, a cylindrical sleeve rotatably mounted in said bearing, said sleeve receiving the adjacent ends of said intermediate shaft and driving shaft extension and forming a drive connection therebetween, means providing a drive connection between the adjacent ends of said intermediate shaft and said conveyor screw, and said housing and bearing being provided with a passage opening at one end into said gear casing and at the other end into the bore of said bearing for passage of lubricant from said gear casing to said sleeve.

11. A drive connection between a driving shaft and a conveyor screw, including an intermediate shaft between and normally in axial alinement with said driving shaft and conveyor screw, a bearing, a sleeve rotatably mounted in said bearing, said sleeve receiving the adjacent ends of said intermediate and driving shafts and forming a drive connection therebetween, the said end of said driving shaft being loosely received in said sleeve, and means providing a loose fitting drive connection between the adjacent ends of said intermediate shaft and said conveyor screw.

12. A drive connection between a driving shaft and a conveyor screw, including an intermediate shaft between and normally in axial alinement with said driving shaft and conveyor screw, a bearing, a cylindrical sleeve rotatably mounted in said bearing, said sleeve receiving the adjacent ends of said intermediate and driving shafts and forming a drive connection therebetween, the said end of said driving shaft being loosely received in said sleeve, means providing a loose fitting drive connection between the adjacent ends of said intermediate shaft and said conveyor screw, and means for transmitting the thrust of said conveyor screw to said bearing.

EUGENE MARTIN.